United States Patent [19]

Maehara et al.

[11] 4,290,265
[45] Sep. 22, 1981

[54] MASTER CYLINDER DEVICE

[75] Inventors: Toshifumi Maehara, Chichibu; Kazuo Kawase, Kuki, both of Japan

[73] Assignee: Akebono Brake Industry Co. Ltd., Tokyo, Japan

[21] Appl. No.: 94,050

[22] Filed: Nov. 14, 1979

Related U.S. Application Data

[63] Continuation-in-part of Ser. No. 933,904, Aug. 15, 1978, abandoned.

[30] Foreign Application Priority Data

Aug. 31, 1977 [JP] Japan ............................ 52-115692[U]

[51] Int. Cl.³ ............................................ B60T 11/06
[52] U.S. Cl. ...................................... 60/561; 60/562; 60/591; 303/6 C
[58] Field of Search ................. 60/561, 562, 591, 581, 60/574, 578; 303/6 C

[56] References Cited

U.S. PATENT DOCUMENTS

| | | | |
|---|---|---|---|
| 3,143,860 | 8/1964 | Stelzer | 60/562 |
| 3,355,887 | 12/1967 | Balster | 60/562 |
| 4,024,712 | 5/1977 | Takeuchi | 60/591 |
| 4,027,482 | 6/1977 | Manzini | 60/591 |

FOREIGN PATENT DOCUMENTS

| | | | |
|---|---|---|---|
| 2253653 | 12/1973 | France | 60/591 |
| 4714534 | 3/1967 | Japan | 303/6 C |

Primary Examiner—Abraham Hershkovitz
Attorney, Agent, or Firm—Stevens, Davis, Miller & Mosher

[57] ABSTRACT

A tandem master cylinder device having a cylinder body slidably receiving therein a driving piston and a floating piston so as to define a first liquid chamber and a second liquid chamber, the device housing a liquid pressure control valve by which a differential in output liquid pressure between a front brake pressure and a rear brake pressure is produced. A stepped piston is mounted on the floating piston to open and close a poppet valve.

8 Claims, 3 Drawing Figures

MASTER CYLINDER DEVICE

This application is a continuation-in-part of application Ser. No. 933,904 filed Aug. 15, 1978 and now abandoned.

BACKGROUND OF THE INVENTION

This invention relates to a tandem master cylinder device for hydraulic brake systems in motor vehicles, the device being particularly designed to produce a difference in output liquid pressure between a liquid chamber connected to a front brake and a liquid chamber connected to a rear brake by means of a liquid pressure control valve housed in the master cylinder device.

As is known, when the braking of the vehicle takes place, the vehicle-body load moves forward and is one-sided towards the front wheels rather than being equally distributed between the front and rear wheels. It is therefore desirable to distribute a braking force depending on this movement of load to the front wheels and rear wheels. For this reason, in the past, a produced liquid pressure from the master cylinder device is directly applied to the front wheels whereas low liquid pressure is applied to the rear wheel brake through a control valve.

SUMMARY OF THE INVENTION

It, therefore, is an object of the present invention to provide a master cylinder device incorporating therein a liquid pressure control valve (a so-called proportioning valve), whereby when the pressure in a pair of liquid chambers exceeds a predetermined level, an output liquid pressure in one liquid chamber is decreased.

Another object of the present invention is to simplify the piping arrangement between the master cylinder and the front and rear brakes so that when there is liquid leakage in a front brake system, pressure of liquid to be fed to the rear brake is directly transmitted to the rear brake in a state where the pressure is not reduced to compensate for a shortage of braking force. To achieve this object, the master cylinder device is designed so that a floating piston interiorly slidably receives a stepped piston receiving the liquid pressure of the front and rear brakes, and balanced motion of the stepped piston causes an outlet pressure in one liquid chamber to be increased at the ratio decreased by a given rate relative to a pressure in the other liquid chamber.

DETAILED DESCRIPTION

Figure 1:
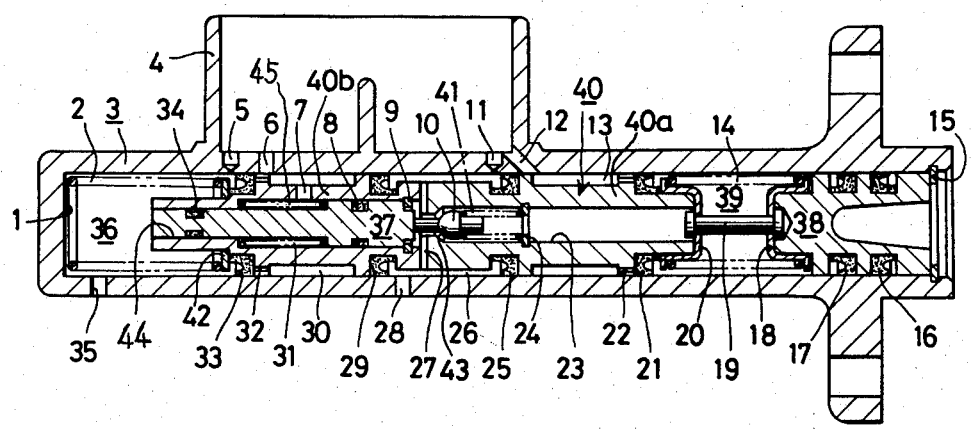
FIG. 1 is a longitudinal sectional view of a tandem master cylinder device in accordance with the present invention.

The structure of the present invention will be described on the basis of a preferred embodiment shown in the drawing. As shown in FIG. 1, the present device has a cylinder body 3, which interiorly slidably receives a floating piston 40 to form a liquid chamber 36 between the floating piston and an end wall 1 and which interiorly slidably receives a driving piston 38 to form a liquid chamber 39 between the driving piston and the floating piston 40. In the outer periphery of the driving piston 38 there are fitted seal rings 17 and 16 to provide liquid-tightness between sliding portions of the piston and the cylinder. A return spring 14 is interposed between a spring seat 18 bearing on the left end surface of the piston 38 and a spring seat 20 bearing on the right end surface of the floating piston 40. The maximum length of the spacing between the spring seats 20 and 18 is controlled by a rod 19, but these seats may come closer to each other than the illustrated position. The floating piston 40 is biased rightwards as viewed in the drawing by a return spring 2 disposed between the floating piston 40 and the end wall 1, and the driving piston 38 is brought into abutment with a stop ring 15 through the spring 14.

For the convenience of machining, the floating piston 40 is divided into axially aligned right and left halves 40a and 40b, and a groove formed in a position where both portions 40a and 40b abut each other constitutes a passage 27. It is noted that portions 40a and 40b may also be fixed integrally by means of screws or the like. The floating piston 40 has a passage 23 extending through a center axis of the portion 40a provided with a poppet valve 10, and a stepped piston 37 is fitted in a stepped cylinder 44 located in the central portion of the portion 40b. This stepped piston 37 is integrally provided with a small diameter portion receiving liquid pressure from the liquid chamber 36 and a large diameter portion receiving liquid pressure from the liquid chamber 26. Seal rings 34 and 8 are fitted in the outer peripheries of the piston 37 to provide a seal between both of the liquid chambers 36 and 26. A space 45 in the cylinder, in which the large diameter portion of the stepped piston 37 fits, communicates with a wide annular groove 30 formed in the outer periphery of the floating piston 40 through a diametrical passage 7. The stepped piston 37 is brought to bear on a stop ring 9 by means of the force of a spring 31 positioned in the space 45.

Seal rings 33 and 29 are retained at opposite ends of the annular groove 30 in the floating piston 40. A return spring 2 is interposed between a spring seat 42 holding the seal ring 33 and the end wall 1. A passage 32 in communication with the annular groove 30 is open to the back of the seal ring 33. A liquid chamber 26 formed by the outer periphery of the floating piston 40 cylinder body 30 and the seal rings 29 and 25 is brought into communication with the liquid chamber 39 through the passage 27, poppet valve 10 and passage 23. This chamber 26 is connected to a rear brake through an outlet 28.

The poppet valve 10 is housed in the passage 23 adjacent the passage 27, and a stem projecting from the left end of the valve is brought to bear on the right end surface of the stepped piston 37 by the force of a spring 41 of relatively lesser load. This spring 41 is retained by a stop ring 24 locked in the midst of the passage 23. The engagement of the poppet valve 10 with the seat 43 cuts off communication between the liquid chambers 39 and 26. Also, in the outer periphery of the portion 40a of the floating piston 40 there is provided a wide annular groove 13, opposite sides of which are sealed by seal rings 25 and 21 in sliding contact with the cylinder 3. A passage 22 in communication with the annular groove 13 is open into the back of the seal ring 21.

In the upper peripheral wall of the cylinder body 3 there is integrally formed a reservoir 4, the interior of which is in communication with the chamber 36 through a passage 5 and in communication with the annular groove 30 through a passage 6. The reservoir 4 is further in communication with the liquid chamber 26 through an inlet passage 11 and in communication with the annular groove 13 through a passage 12. The liquid chamber 36 is connected to the front brake through the outlet 35.

The thus constructed tandem master cylinder device operates as follows. Since, in a release state of the brake, the return spring 14 is set in load greater than the return spring 2 and the force of the spring 14 is restrained by the rod 19 and spring seats 20 and 18, the floating piston 40 and driving piston 38 are biased to their return position by means of the return spring 2. That is, the driving piston 38 bears on the stop ring 15 so that the seal ring 33 is positioned close to the inlet passage 5 and the seal ring 25 close to the inlet passage 11.

Figure 2:
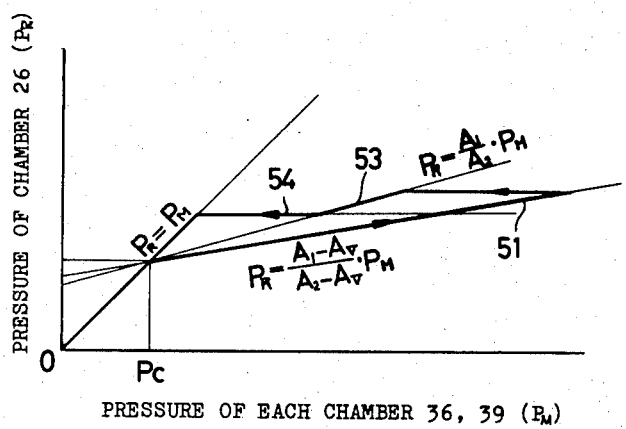
FIG. 2 is a diagram explaining the operation of the device shown in FIG. 1.

Now, when the brake is operated by pressing the driving piston 38, the driving piston 38 and floating piston 40 are integrally urged towards the left to cause the seal ring 25 to block the inlet passage 11 and at the same time, cause the seal ring 33 to block the inlet passage 5. When the driving piston 38 is successively urged, the liquid in the liquid chamber 39 is pressurized and passes through passages 23 and 27 into the liquid chamber 26 and thence is fed into the rear brake through the outlet 28. Also, the liquid in the liquid chamber 36 is also pressurized and fed into the front brake through the outlet 35. The produced pressures $P_M$ of the liquid chambers 39 and 36 respectively, are the same for a time since the floating piston 40 may freely move to adjust the balance of pressures of the liquid chamber 39 and liquid chamber 36. During that time the stepped piston 37 is biased against the stop ring 9 by the spring 31 to open the poppet valve 10. In this state, therefore, the liquid pressure $P_R$ at the outlet 28 is equal to the liquid pressure $P_M$ at the outlet 35, as shown in FIG. 2, the pressure varying in proportion to the operating force applied to the driving piston 38. When the liquid pressure $P_M$ of the liquid chamber 36 reaches a predetermined value $P_C$, the stepped piston 37 is relatively displaced leftwards, and as a result the poppet valve 10 is displaced leftwards by the force of the spring 41 and then engages the seat 43.

In this state, if $A_1$ is the sectional area of the small diameter portion of the stepped piston 37, $A_2$ the sectional area of the large diameter portion, and F the force of the spring 31, then the following relationship is obtained.

$$P_M = P_R = P_C = F/(A_2 - A_1)$$

When the liquid pressure $P_M$ exceeds the liquid pressure $P_C$, the stepped piston 37 moves rightwards to open the poppet valve 10, and as a consequence, the pressure in the liquid chamber 26 increases. With this increased pressure, the stepped piston 37 again moves leftwards to close the poppet valve 10. Thereafter, the opening and closing operation of the poppet valve 10 is repeated and the liquid pressure $P_R$ in the liquid chamber 26 increases but is reduced by a given ratio relative to the liquid pressure $P_M$ in the chambers 36 and 39. This relationship represented by the following formula.

$$P_M A_1 - P_R A_2 + F + P_R A_V - P_M A_V = 0$$

$$P_R = \frac{A_1 - A_V}{A_2 - A_V} P_M + \frac{F}{A_2 - A_V} \quad (1)$$

where $A_V$ is the pressure receiving area of the valve 10 when the latter is seated. Accordingly, when the driving piston 38 is successively urged, the pressure $P_M$ of the liquid chamber 36 is directly transmitted to the front brake, the pressure $P_R$ of the liquid chamber 26 increase in a state expressed by the above-described formula (1) and pressure $P_R$ lower than the front brake pressure $P_M$ is transmitted to the rear brake.

Next, the operation when pressure is reduced due to release of brake will be described.

When the operating force applied to the driving piston 38 is decreased, the pressure in the chambers 36 and 39 begin to reduce. The poppet valve 10 is seated and the stepped piston 37 remains motionless until the pressure in the chamber 36 is sufficiently reduced. Thereafter, the pressure in the liquid chamber 26 is maintained. When the relationship of $P_R \cdot A_2 > P_M \cdot A_1$ is obtained, the stepped piston 37 continues to move leftwards until the spring 31 comes into intimate contact therewith while maintaining the relationship of $P_R = A_1 \cdot P_M / A_2$ and the pressure $P_R$ in the chamber 26 is reduced. This reduction of pressure is indicated by the line 53 in FIG. 2. When an intimate contact of stepped piston 37 with the spring 31 occurs, the movement of the stepped piston 37 stops so that the pressure in the chamber 26 is again maintained. This state is indicated by the line 54 in FIG. 2. When the pressure in the chambers 36 and 39 becomes approximately equal to the pressure in the chamber 26, the poppet valve 10 having been closed is opened by the pressure in the chamber 26. As a consequence the pressure in the chamber 26 becomes the same level as that of the chambers 36 and 39.

If a failure or liquid leakage should occur in the pressure system of the liquid chamber 36, the operating force would cause the floating piston 40 to be moved leftwards by means of the driving piston 38 and the spring 14 so that the left end of the floating piston 40 abuts the end wall 1 of the cylinder body and at this time the left end of the stepped piston 37 also abuts on the end wall 1 and hence the poppet valve 10 remains opened. As a result, the liquid in the liquid chamber 39 pressurized by the driving piston 38, enters the liquid chamber 26 passing through the passages 23 and 27 and is fed to the rear brake through the outlet 28. In this case, the brake liquid in the chamber 26 is not reduced in pressure.

Further, in the case of a failure in the pressure system of the liquid chamber 26, the stepped piston 37 receives the liquid pressure of the liquid chamber 36 to engage the stop ring 9. Thus, the driving piston 38 directly impinges upon the floating piston 40 to drive it, whereby the produced pressure in the chamber 36 is properly transmitted to the front brake.

As described above, the device of the present invention affords excellent effects such that it is possible to distribute a braking force depending on movement of the vehicle-body load when braking takes place, and that since the floating piston is interiorly provided with a poppet valve serving as a liquid pressure control valve and a stepped piston, it becomes simple to provide connection and piping between the master cylinder device and the brake output sections.

Figure 3:
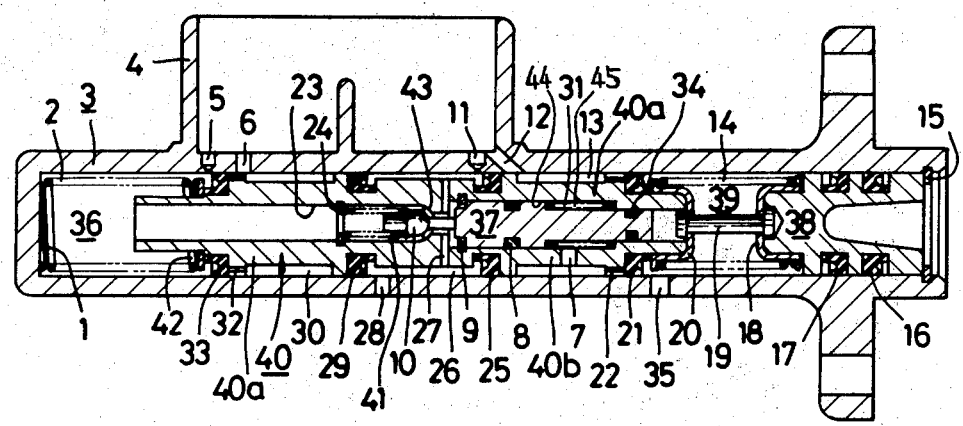
FIG. 3 is a longitudinal sectional view of another embodiment of the present invention.

As shown in FIG. 3, it may also be designed so that the small diameter portion of the stepped piston 37 is exposed to a liquid chamber 39 between the driving piston 38 and the floating piston 40, the poppet valve 10 is disposed between a liquid chamber 36 between the floating piston 40 and the end wall 1 of the cylinder and a liquid chamber 26 connected to the rear brake, and the liquid chamber 39 between the driving piston 38 and the floating piston 40 is connected to the front brake. In this case, if a failure occurs in the front brake system, the rod 19 bears on the small diameter portion of the stepped piston 37 when braking takes place, and after all, movement of the stepped piston 37 is limited by the driving piston 38, as a consequence of which the poppet valve 10 remains opened and the rear brake pressure is not reduced.

What is claimed is:

1. A master cylinder device for a vehicle in which a valve mechanism for reducing and controlling rear brake pressure with respect to front brake pressure is accommodated within a piston of the master cylinder comprising:
   a driving piston and a floating piston which are slidably moved within a cylinder body;
   a first liquid chamber formed between said driving piston and said floating piston;
   a second liquid chamber formed between said floating piston and an end wall of said cylinder body;
   a third liquid chamber connectable to a rear brake;
   a stepped cylinder formed within said floating piston and having a large diameter portion and a small diameter portion;
   a stepped piston having large and small diameter portions sealingly slidable respectively in said large and small diameter portions of said stepped cylinder, which has said small diameter portion facing one of said first and second liquid chambers and said large diameter portion facing said third liquid chamber;
   a valve mechanism disposed in a passage having a valve seat which provides a communication between the other of said first and second liquid chambers and said third liquid chamber, said valve mechanism including a valve member cooperating with said valve seat, said valve mechanism being closed in response to movement of said stepped piston towards said one of said first and second liquid chambers, said stepped piston being separate from and relatively movable with respect to said valve member; and
   a spring for biasing said stepped piston towards said third liquid chamber to open said valve mechanism.

2. A master cylinder device for a vehicle according to claim 1 wherein a front brake is connected to said one of said first and second liquid chambers.

3. A master cylinder device for a vehicle according to claim 2 wherein when a failure occurs in a liquid pressure system associated with said one of said first and second liquid chambers, movement of said stepped piston towards said one of said first and second liquid chambers is limited by one of those selected from said end wall and said driving piston, and said valve mechanism remains opened.

4. A master cylinder device for a vehicle according to claim 1 wherein said third liquid chamber is disposed in the outer periphery of said floating piston.

5. A master cylinder device for a vehicle according to claim 1 wherein a fourth chamber for accommodating said spring is connectable to a reservoir.

6. A master cylinder device for a vehicle according to claim 1 wherein said floating piston is constituted by two axially aligned divided bodies which are slidably inserted within said cylinder body.

7. A master cylinder device for a vehicle according to claim 5 wherein a part of said passage is formed in a portion where said two divided bodies abut each other.

8. A master cylinder device for a vehicle in which a valve mechanism for reducing and controlling rear brake pressure with respect to front brake pressure is accommodated within a piston of the master cylinder comprising:
   a driving piston and a floating piston which are slidably moved within a cylinder body, said floating piston being constituted by two axially aligned divided bodies which are slidably inserted within said cylinder body;
   a first liquid chamber formed between said driving piston and said floating piston;
   a second liquid chamber formed between said floating piston and an end wall of said cylinder body;
   a third liquid chamber connectable to a rear brake;
   a stepped cylinder formed in one of said two divided bodies within said floating piston and having a large diameter portion and a small diameter portion;
   a stepped piston slidable in said large and small diameter portions of said stepped cylinder, which has said small diameter portion facing one of said first and second liquid chambers and said large diameter portion facing said third liquid chamber;
   a valve mechanism in the other of said two divided bodies in a passage which provides a communication between the other of said first and second liquid chambers and said third liquid chamber, said valve mechanism being closed in response to movement of said stepped piston towards said one of said first and second liquid chambers, and
   a spring for biasing said stepped piston towards said third liquid chamber to open said valve mechanism.

* * * * *